UNITED STATES PATENT OFFICE.

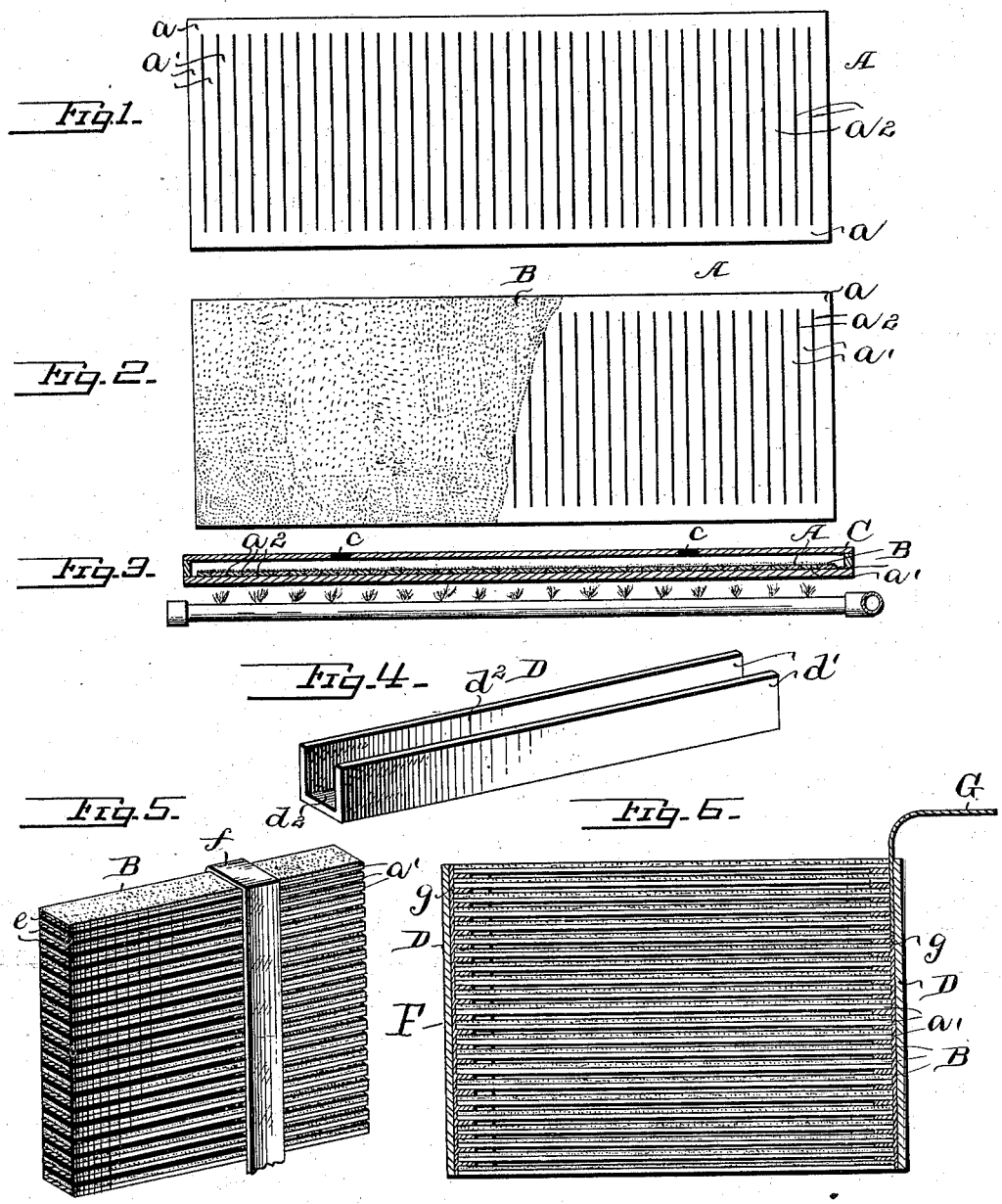

ISIDOR KITSÉE, OF PHILADELPHIA, PENNSYLVANIA.

METHOD OF MANUFACTURING ELECTRODES FOR SECONDARY BATTERIES.

SPECIFICATION forming part of Letters Patent No. 558,692, dated April 21, 1896.

Application filed November 8, 1894. Serial No. 528,181. (No model.)

*To all whom it may concern:*

Be it known that I, ISIDOR KITSÉE, a citizen of the United States, residing at the city of Philadelphia, in the county of Philadelphia and State of Pennsylvania, have invented a new and useful Art or Method of Manufacturing Electrodes for Secondary Batteries, of which the following is a specification, reference being had to the accompanying drawings, forming part hereof.

The object of my invention is to produce electrodes for secondary cells in a more simple and better manner than can be effected by the methods heretofore practiced, and at the same time to produce a better and more durable electrode than can be produced by existing methods.

The whole class of secondaries may be well divided into those where the electrodes are formed according to the Planté method, those where the electrodes are formed according to the Faure process, and those the electrodes of which are prepared by the electrolytic process, respectively. To the last class my invention properly belongs.

For a time electrodes prepared by the electrolytic process were considered to be the electrodes of the future, and, indeed, theoretically, they should be all that is required for a secondary cell; but in practice it has been discovered that to make a durable and efficient electrode, one which should be covered equally on its whole surface, is well nigh impossible.

An electrode, as is well known, cannot consist of a plain and smooth vertically-placed plate, because the action of the current tends to loosen and does loosen the material capable of giving out or taking in the current from its support, and therein consists the great advantage the perforated plates of Faure have over and above the unperforated plates of other inventors. The active material, so to speak, subjected as it is to chemical changes different, at least in degree, from the changes the conducting-support is subjected to, tends to separate from it, and by its own gravity drops to the bottom of the cell. It is therefore necessary either to provide the plate to be subjected to the process by which metallic lead is to be deposited on it by the action of the current with recesses, corrugations, or other suitable receptacles capable of retaining the material deposited, or to so afterward arrange the plates having already the deposit that the material cannot easily be displaced; but as necessary as it is to provide plates to be used as elements for secondary cells with projections, depressions, corrugations, or other supports to hold the active material in place, so fatal in the electrolytic process, is the result thereof. No matter how shallow the depressions or how short the projections the deposit will not be equally distributed if such depressions or projections exist at all, and even if the plate is plain and smooth throughout the deposit will be unequal if the distance of one part of the plate from the opposite element is greater or less than the distance of the other part. To overcome this difficulty, I have recourse to the following arrangement:

I first prepare a plain and even plate, and subject the same to the action of the electrolytic bath, and after having deposited on it the material in required thickness I shape or cut the plate in such manner as that it shall be best suited for the finished electrode. In other words, the raw or unfinished plate is subjected to the depositing action, and the plate with its deposit is then brought to a finished state by either compressing parts of it, or cutting it up, and then so arranging it that it shall not be subject to the disintegrating process above referred to; but one more and equally great objection all electrodes prepared according to the electrolytic process are subject to, and this objection consists in the chemical change the deposit undergoes if placed in sulfuric acid, the common electrolyte for secondary cells. The electrodeposition of lead can be best carried out with a solution of acetate of lead or nitrate of lead, and instead of the latter nitric acid alone, using a heavy lead plate as the anode. The deposited material is not free from the solution, and even the salts of the electrolyte are not always absent. If now a plate having been placed and deposited in a nitrate bath be placed in sulfuric acid, a chemical action at once takes place and sulfate of lead is formed, this action being accompanied with a displacement of the deposited material. It breaks up, crumbles, or powders, and if at the same time the current is sent through, more especially if such plate is used as the positive sign, the whole deposit is in a very short time found as a sulfate powder at the bottom of the cell. To prevent such disintegration, it was thought that a simple exposure to the air would suffice, because the air, in drying the plate, would make the deposit more adherent; but such practice has not given good results. The nitrate or acetate was found to be still present either in a combined or free state, usually in both, and a chemical reaction always followed the immersion of the plate in sulfuric acid. If a deposit of lead from a nitrate solution be subjected to the action of heat, the surplus acid will be entirely expelled, as can easily be ascertained by chemical test, and can, to some extent, through taste or by the smell of the surrounding air, while at the same time the outer layer of the deposit is changed into a suboxid, (2PbO,) thus greatly facilitating the forming process to which the deposit is subjected later on.

I have described the two necessary steps to make an efficient and practical electrode for secondary cells according to the electrodeposition method in general, because the same is advantageous no matter what form the finished electrode shall have and no matter what the electrolytic bath may be as long only as it is capable of effecting a lead deposit; but I prefer as the electrolytic bath either nitric acid or a nitrate-of-lead solution in water, and for the finished electrode I prefer one composed of a multitude of horizontally-placed strips connected together so as to form one continuous mass.

Referring now to the drawings, Figure 1 is a plan view of a sheet of lead partly prepared. Fig. 2 is a plan view of the same sheet after the deposition of lead upon it. Fig. 3 is a vertical transverse section of a closed chamber provided with small openings and a source of heat under said chamber, with a sheet of lead inside the chamber. Fig. 4 is a perspective view of a grooved end piece which I prefer to use in the make-up of the electrode. Fig. 5 is a sectional perspective view of the partly-finished electrode, and Fig. 6 is a vertical transverse section of the finished electrode before being subjected to the "forming" process.

In Fig. 1, A is the sheet of lead, $a$ the uncut parts of it, and $a'$ $a'$ $a'$ the parts through which the cuts $a^2$ $a^2$ $a^2$ extend. In my first experiments I have used plain sheets minus the cuts shown in this figure; but I prefer to make the electrode by cutting the sheet in strips of one-quarter inch width. I found that the handling of the sheet with its deposit was very troublesome. It was hardly possible to cut the whole piece into strips without destroying parts of the deposit, and I therefore adopted the plan as illustrated. The continuity of the sheet is preserved by the strip $a'$, and yet the greater part of the sheet is already cut into strips. This sheet I subject to the action of the electrolytic bath.

In Fig. 2, where A represents, as in the above figure, the sheet, and $a$, $a'$, and $a^2$ the uncut parts, the cut parts, and the cuts, respectively, B' is the deposit acquired by the sheet in the electrolytic bath.

In Fig. 3, C is the closed chamber, which may consist of any material capable of withstanding the action of heat and liberated fumes. In practice, when manufacturing on a large scale, the recess in an oven made of clay answers well for the purpose; but when small quantities are required and the material for a closed chamber is not very handy it suffices to place an iron plate over the flame and the lead plate above the iron plate. The openings are designated by $c$ and are required to allow the escape of the liberated steam and fumes.

In Fig. 4, D represents the grooved material as an entirety, $d'$ and $d'$ the flanges or sides, and $d^2$ the space formed by said sides. I prefer to use a non-conducting material; but a grooved piece of lead or a half-tube would answer the purpose. The reason of my preference consists, to a great extent, in the fact that a non-conducting material allows its use as a separator as well, and dispenses with the necessity of additional non-conducting separators.

In Fig. 5, $a'$ $a'$ are the lead strips cut from the sheet A. $e$ are strips of a different material placed temporarily between the strips $a'$, and $f$ is a rubber band to hold the whole together.

The *modus operandi* in making the finished product is the following: The sheet of lead after it comes from the source of heat is cut into pieces or strips of the required length, and as it is best that the original sheet of lead should be only of the dimensions required it is only necessary to extend the cuts and sever the already nearly severed strips. These strips are then placed each above the other, and between each is placed a strip of the same width, but shorter than the lead strips themselves. These second strips I call the "spacing-strips," and they can be either of conducting or non-conducting material, but it is as well if they simply consist of wood. After the strips of lead and wood are placed alternately one above the other to the required height the whole are temporarily bound together by placing a rubber band around them. The whole are then placed so that the ends on one side protrude into one of the grooved pieces. A mixture capable of holding the ends in the grooves, cementing them together, is then poured into the space formed by the grooved piece. It is best for this purpose to use an alloy of lead with bismuth, and added to it a slight proportion of antimony. Two per cent. of the former and one per cent. of the latter are sufficient, but certainly the proportions may vary to suit the requirements. The alloy being melted is poured in the groove and forms there, with the ends of the lead strips, into a compact mass.

The same process is repeated with the other strip ends.

The lead should be cleaned before the alloy is poured. It is also well either to powder the ends a little with rosin or else to moisten them with a chloride solution—for instance, zinc in hydrochloric acid, the so-called "tinning" solution.

In Fig. 6, F is the finished electrode as an entirety; $a'$, the leaves or strips of said electrode; B, the deposit on same; D, the end supports, and $g$ the alloy part, holding the ends of the strips $a'$ together. G is the lug with which the electrode is provided, so as to be enabled to be connected with an outside circuit conveniently. The wooden strips, it is understood, have been removed.

To prevent misunderstandings, I declare that wherever I use in this specification or claims following the same the word "raw" or "unfinished" in connection with electrodes I mean a material designed to be used as the conducting part of the electrode, but having not yet the shape and appearance of the electrode as it is designed to be, and wherever I use the word "finished" in connection with electrodes I mean the material after it has been shaped or formed into the shape and assumed the appearance of the electrode.

Having now described my invention, what I claim as new, and desire to secure by Letters Patent, is—

1. The method of constructing an electrode for secondary cells, which consists in subjecting conducting material in its raw and unfinished state to the action of the current in an electrolytic bath, then subjecting the material to the action of heat and finally shaping it into the required form of the electrode, substantially as described.

2. In the manufacture of electrodes for secondary cells having an electrodeposited surface, the process which consists in changing the deposited lead surface through the action of heat in the presence of oxygen containing material, into a low oxid substantially as and for the purpose specified.

3. The method of constructing an electrode which consists in the following steps: first, providing conducting material with a metallic deposit through electrolytic action in an acid bath; second, subjecting the conducting material so provided to the action of heat; third, constructing of the same material an electrode substantially as described.

In witness whereof I have hereunto set my hand and seal in the presence of two subscribing witnesses.

ISIDOR KITSÉE. [L. S.]

Witnesses:
   CHAS. C. COLLIER,
   GEO. A. VAILLANT.